Figure 1:
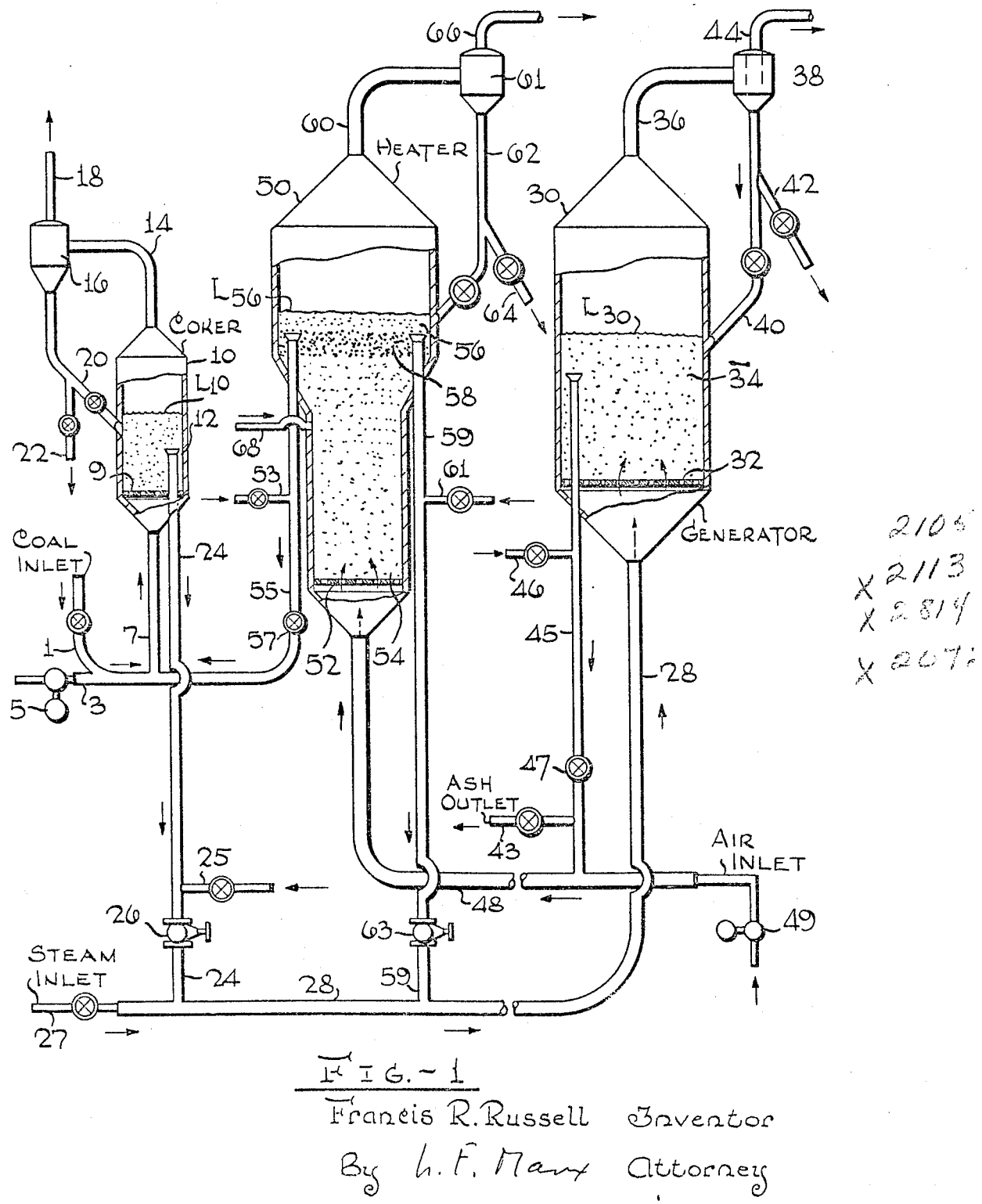

April 10, 1956  F. R. RUSSELL  2,741,549
CONVERSION OF CARBONACEOUS SOLIDS INTO VOLATILE PRODUCTS
Original Filed Dec. 17, 1946  3 Sheets-Sheet 1

Francis R. Russell Inventor
By L. F. Marx Attorney

Francis R. Russell Inventor

Francis R. Russell  Inventor

United States Patent Office 2,741,549
Patented Apr. 10, 1956

2,741,549

CONVERSION OF CARBONACEOUS SOLIDS INTO VOLATILE PRODUCTS

Francis R. Russell, Mountainside, N. J., assignor to Esso Research and Engineering Company, a corporation of Delaware Continuation of abandoned application Serial No. 716,748, December 17, 1946. This application November 1, 1952, Serial No. 318,165.

7 Claims. (Cl. 48—206)

The present invention relates to the conversion of carbonaceous materials including solids such as all types of coal, lignite, peat, oil shale, tar sands, coke, oil coke, cellulosic materials, including lignin, and hydrocarbonaceous liquids such as residual oils, into volatile products, such as light oils, tars, coal gases, producer gas, gases containing CO and $H_2$, or the like, by coking carbonization and/or gasification in a fluidized solids process.

Prior to the present invention it has been suggested to carbonize and/or gasify carbonaceous solids in the form of a dense turbulent bed of finely divided solids fluidized by an upwardly flowing gas. A more recent development of this technique involves a supply of the heat required by said conversion as sensible heat of finely divided solid combustion residue circulated from a separate fluid combustion zone or heater to the heat consuming conversion zones while circulating carbonaceous solids from the conversion zone to the heater to support the combustion therein. A system of this type combines the known advantages of the fluid solids technique, such as continuity of operation, uniformity of temperature, ease of temperature control and solids handling with the recovery of volatile conversion products substantially free of diluting gases. However, certain difficulties are encountered which may be overcome in accordance with the present invention as will appear hereinafter.

In the generation of heat by the combustion of solid fuels with air in a heater of the type mentioned above, the principal products of combustion are carbon monoxide, carbon dioxide and water. It is known that most efficient utilization of both the carbon of the fuels and the oxygen of the air is obtained by conducting the combustion in such a manner as will produce carbon dioxide in preference to carbon monoxide. Formation of carbon monoxide instead of carbon dioxide in the combustion reaction consumes more carbon and requires more oxygen per unit of heat generated, as illustrated by the following equations:

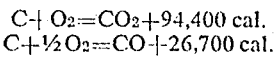

$$C + O_2 = CO_2 + 94,400 \text{ cal.}$$
$$C + \tfrac{1}{2}O_2 = CO + 26,700 \text{ cal.}$$

In the manufacture of fuel gases, such as water gas wherein a separate heater burning part of the carbon of the charge is used to generate the heat required, the formation of carbon monoxide in the heater cannot be avoided. Hot carbon, which by nature of these processes must be present in excess, has a strong tendency to reduce carbon dioxide to carbon monoxide. This reduction consumes part of the heat generated by the original formation of carbon dioxide.

The loss in calorific efficiency caused by the formation of substantial proportions of carbon monoxide in the generation of heat by the combustion of solid fuels is of particular importance in such processes as involve the utilization of the hot solid combustion residue, in the manner described above, to supply the heat required by various endothermic chemical reactions, such as the manufacture of gases containing carbon monoxide and hydrogen, for instance water gas or synthesis gas for the synthetic production of hydrocarbons, the coking and cracking of solid and liquid carbonaceous materials, and the like. This technique ordinarily involves circulation from the heater to the conversion zones, of quantities of non-conversion materials considerably in excess of the amount of carbon used in the conversions, in order to supply the large amounts of heat required in the conversions. While for this purpose, the non-conversion material might be unreacted conversion material, such as coke or coal, a circulation of the required large excess of coke or coal to the heater establishes in the latter conditions most favorable to the formation of carbon monoxide and conducive to the loss of calorific efficiency.

In these cases the ratio of fluidized solids to combustion air circulation rate is fixed by heat transport considerations; the rate of contact of carbon with air can be controlled only by maintaining carbon concentration in the circulating solids stream at the proper level. In the carbonization of coal and the manufacture of water gas, however, losses of solids from the fluid beds are often larger than the amount of ash charged to the system in the fresh coal. This tends to increase the carbon concentration in the fluid beds. For instance, if loss, such as suspended material in the discharge gas or the like, is twice as much as the amount of ash charged to the system, average concentration of process solids in the ash in the solids circulating stream must build up to about 50% of the total. Such concentration is conducive to CO formation in the combustion zone, as outlined above.

The present invention provides improved means for supplying heat to an endothermic process converting carbonaceous materials into valuable volatile products.

This invention provides improved means for producing, by the combustion of carbon at a relatively low carbon concentration, the heat required by a fluidized solids endothermic conversion process.

In accordance with the present invention, a subdivided non-combustible solid is added to a heat generating combustion zone wherein subdivided carbonaceous solids are subjected to combustion, carbon-containing solids as a heat carrier are returned from the combustion zone to an endothermic conversion of fluidized carbonaceous solids and the added non-combustible solids are separated from the carbon-containing solids used as heat carrier, prior to introduction of the latter into the conversion zone. The added non-combustible solids may be an inert low-cost material, such as sand, clay, furnace ash, ash from the carbonaceous charge and the like.

It will be appreciated that this procedure affords a convenient means for reducing the carbon concentration in the combustion zone to a desirable level of about 1% or less to assure maximum heat generation while the carbon concentration in the conversion zone may be considerably higher, say in the neighborhood of about 5–50%. At these concentrations, the conversion, for example the gasification with steam, proceeds at a satisfactory rate under otherwise normal conditions.

The separation of added non-combustible solids from carbonaceous solids to be used as heat carrier is facilitated, in accordance with the present invention, by using the added solids in a form which differs from the prevailing form of the solid used as heat carrier in at least one physical characteristic which may form the basis of solids separation by physical means. The physical characteristic is preferably either size or density or a combination of the two which determines the buoyancy of a solid in a fluid solids bed, its separability by screening, its suspendability in gases, its sensitivity to centrifugal action or any combination of these properties. Other physical characteristics of this type include magnetic and/or electric properties which may be utilized for selective magnetic and/or electric separation and precipitation.

In accordance with the preferred embodiment of this invention, the added non-combustible solids have a particle size substantially different from that prevailing for the solid used as heat carrier. Particularly when the added material is of coarser particle size than the heat carrier solid the two materials may be separated most readily and efficiently.

For example, the flow conditions in a vertical combustion zone containing finely divided carbonaceous solids and non-combustible solids of larger particle size fluidized by an upwardly flowing gas may be so controlled that most of the combustion takes place in a lower layer consisting predominantly of non-combustible added solids reducing the carbon concentration to the desired level while the solid carbon-containing combustion residue of smaller particle size concentrates in an upper layer from which it may be withdrawn to supply heat to a conversion zone. This upper layer is preferably shallow to prevent substantial conversion of $CO_2$ to CO by contact with the carbon in said upper layer. The degree of separation may be enhanced by various means, such as reducing the linear gas velocity in the upper layer or by inserting screening means, such as a refractory tower packing of non-fluidizable particle size between the layers. The heater may be so operated that substantially all of the coarse added material remains in the lower layer while the finer solid carbonaceous combustion residue is passed from the upper layer to the conversion zones to supply heat.

The heater may also be so designed and operated that a mixture of added non-combustible material and solid combustion residue is withdrawn therefrom. In this case, separation is effected outside the heater and preferably out of contact with the $CO_2$-containing flue gases by centrifugal means or by elutriation and/or settling classification. Added non-combustible material is returned to the heater and solid carbonaceous combustion residue is passed to the conversion zones.

It should be understood that the separation of the two types of solids need not be quantitative. Control of carbon concentration is the principal purpose of the invention. This purpose may be well accomplished by means of a relatively crude separation.

Instead of adding an extraneous solid differing in a physical characteristic from the heat carrier, low-carbon ash of the carbonaceous process material having physical characteristics differing from those of the high-carbon ash to be circulated to the gas generator may be permitted to accumulate in the system after a suitable separation from high-carbon ash until the desired low-carbon concentration in the heater is reached. Thereafter, a stream of said accumulated and separated low-carbon ash may be continuously circulated from and to the heater. By a suitable choice of the heater dimensions and a proper control of the amount of solids recycled to the heater with said stream, any desired differential between the carbon concentrations in the conversion zone and the heater may be maintained.

Figure 2:
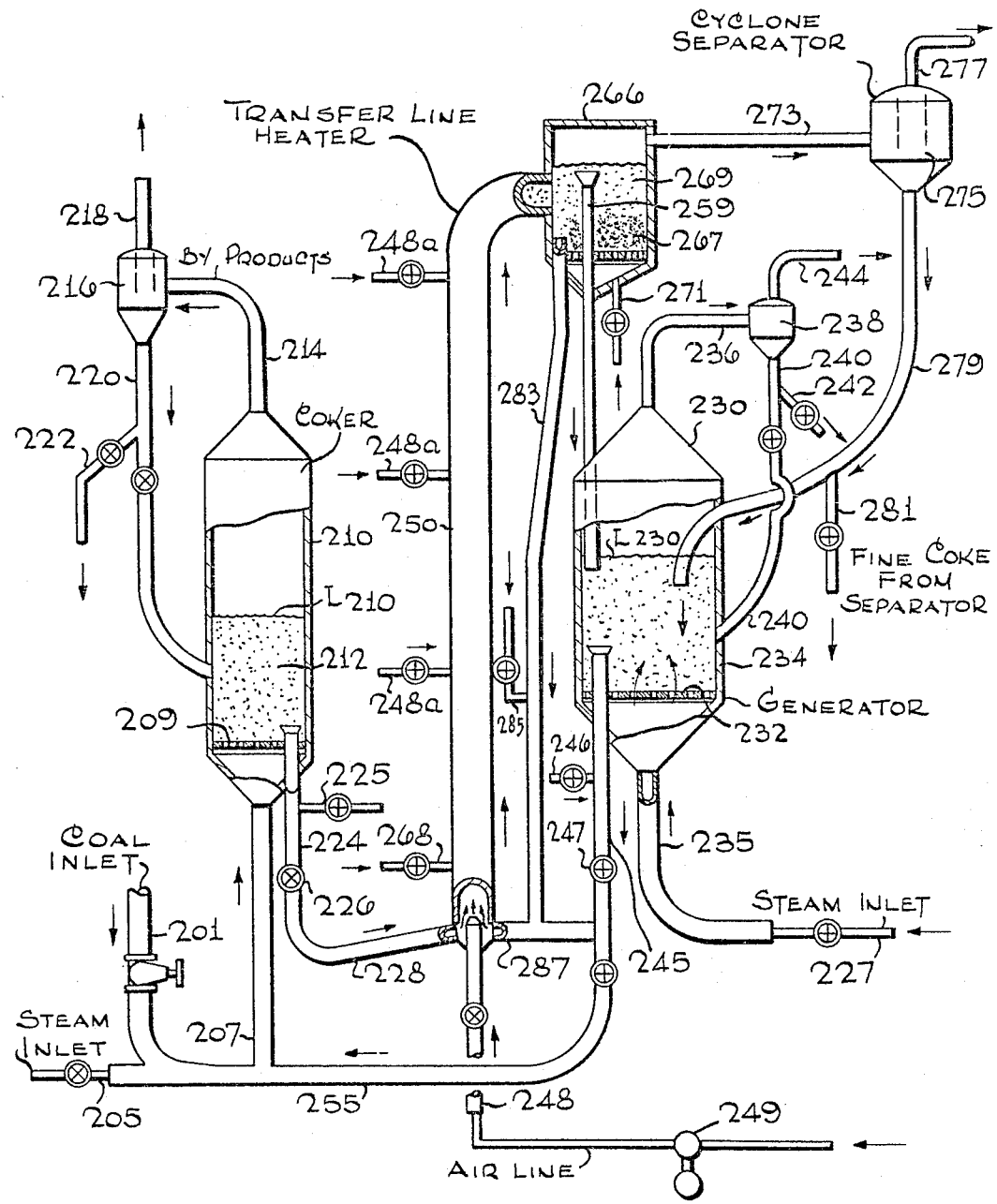
Figure 3:
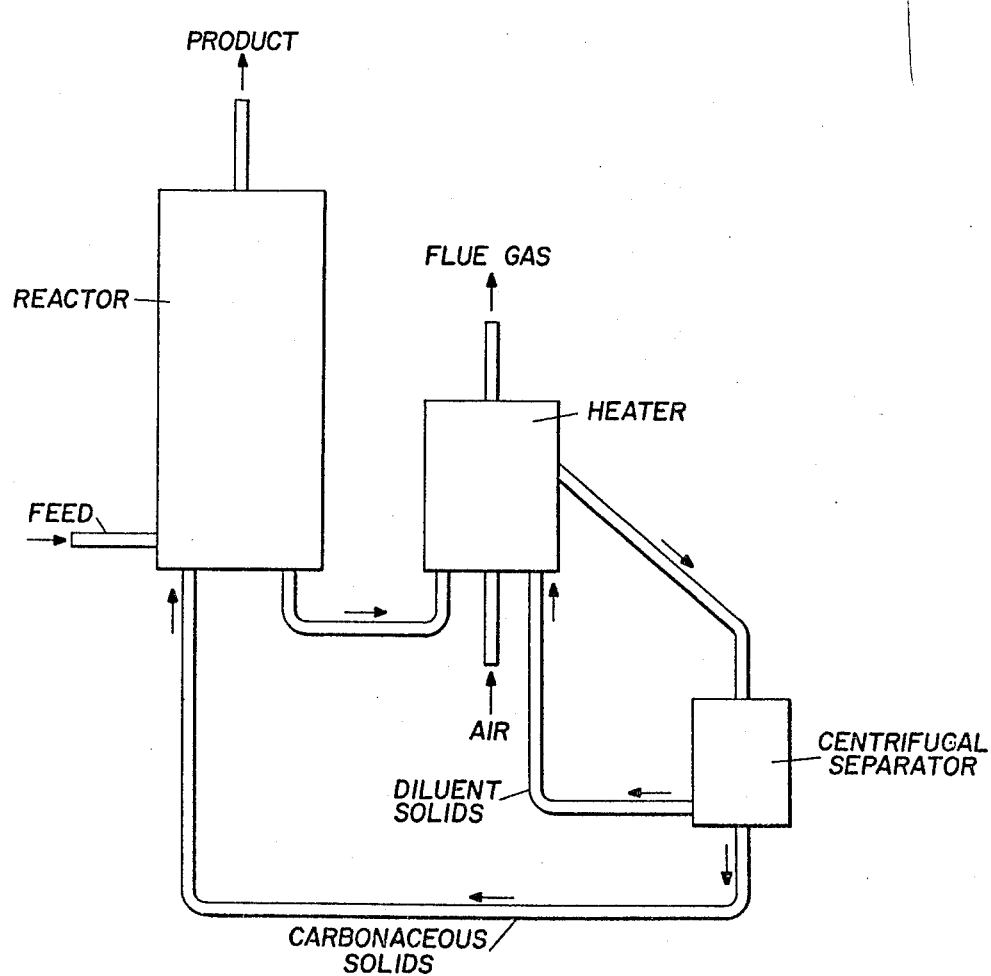

Having set forth its general nature and objects, the invention will be best understood from the following detailed description of the accompanying drawing in which Figure 1 is a semi-diagrammatic illustration of a system suitable for carrying out a preferred embodiment of the invention;

Figure 2 is an illustration of a system employing a different type of heater; and Figure 3 illustrates an alternative method of separating the heat carrying solids from the diluent solids using a centrifugal separation zone.

Referring now in detail to Figure 1, the system shown therein essentially comprises a coker 10, a water-gas generator 30 and a heater 50 whose functions and cooperation will be forthwith explained. It should be understood, however, that either zone 10 or 50 or both may serve different purposes, such as preheating, drying, the production of producer-gas or any other endothermic treatment of carbonaceous solids. While coal will be referred to hereinafter as the carbonaceous solid used, other solid carbonaceous material and liquid hydrocarbonaceous materials may serve as charge to the process.

In operation, a carbonization coal in finely divided form, for example, of the order of 50% having a size of less than 100 mesh, is fed through pipe 1 and line 7 to the lower conical portion of coker 10. Any conventional feeding device for finely divided solids, such as an aerated standpipe, a pressurized feed hopper or mechanical conveyor, may be used to feed the coal to the system. The coal is picked up in pipe 3 by a fluidizing gas, such as steam, flue gas, or the like, supplied to line 3 by compressor 5. The dilute suspension formed passes into line 7 and through a distributing device, such as a perforated grid 9, into the carbonization zone 12 of coker 10 where the coal is subjected in the form of a dense, ebullient, fluidized mass forming a well defined upper level $L_{10}$ to coking temperatures of between about 800° and 2000° F.; low carbonization temperatures of about 850° to 1200° F. are preferred to produce a highly reactive coke for gasification. The heat required for the carbonization reaction is supplied by highly heated solid combustion residue recirculated from heater 50 through line 55 as will appear more clearly hereinafter.

The superficial velocity and amount of the fluidizing gas admitted through line 3 to coker 10 are so chosen that within carbonization zone 12 a superficial gas velocity of about 0.3–3 ft. per sec. and a fluidized bed density of about 10–50 lbs. per cu. ft. are established.

Product vapors containing small amounts of carbonaceous fines are passed overhead from level $L_{10}$ through line 14 and a conventional gas-solids separation system such as cyclone separator 16. Vapors and gases substantially free of solids are withdrawn through line 18 for further treatment in a conventional recovery system (not shown) for the production of such carbonization products as coal gas, oil, tar, chemicals, etc. Solids separated in separator 16 may be recycled through pipe 20 or discarded from the system through line 22.

Fluidized coke admixed with combustion residue is withdrawn downwardly from carbonization zone 12 from a point above grid 9 through line 24 which may be a standpipe aerated and stripped with steam through one or more taps 25 and provided with a control valve, such as a slide valve 26. The fluidized solids are then passed to line 28 wherein they are suspended in steam supplied from line 27. The so diluted suspension is passed under the pseudo-hydrostatic pressure of standpipe 24 to the lower conical portion of gas generator 30 and through a distributing grid 32 into gas generation zone 34.

The relative and absolute proportions of steam and solids in line 28 and the superficial gas velocity within zone 34 are so chosen that a dense fluidized mass with an upper level $L_{30}$ forms above grid 32, in a manner similar to that described in connection with coker 10. Gas generation zone 34 is maintained at a temperature of between about 1400° and 2400° F., preferably about 1600°–1800° F. at about atmospheric to 400 lbs. per sq. in. pressure to permit the water gas reaction to take place between the steam and the carbon of the fluidized solids bed.

The heat required for the water gas reaction is supplied by highly heated carbonaceous solids recirculated from heater 50 through line 59 at the desired temperature, as will appear more clearly hereinafter. The carbon concentration within zone 34 is maintained at about 10–50% or higher by a proper adjustment of the ash withdrawal or ash loss overhead, for instance, through lines 42, 43 and/or 64, which is adjusted so as to hold the carbon at the desired concentration in generator 30 as determined by the economic balance of the process.

A gas consisting mainly of CO and $H_2$ is taken overhead from generator 30 through line 36 and gas-solids separator 38. Separated solids may be returned through line 40 to zone 34 or discarded from the system through line 42. Water gas substantially free of solids is withdrawn through line 44 to be passed, if desired after heat exchange with process gases and/or solids, to any suitable use as a fuel gas, for hydrocarbon synthesis and others.

Solid gasification residue comprising a mixture of carbon and ash is withdrawn downwardly through line 45 which may be a conventional standpipe aerated and stripped with steam or air through one or more taps 46 and provided with a slide valve 47. The fluidized solids pass into line 48 wherein they are picked up by air supplied from compressor 49.

The dilute suspension of solids-in-air flows under the pseudo-hydrostatic pressure of standpipe 45 to the lower conical portion of heater 50 and enters the substantially cylindrical combustion zone 54 through distributing grid 52.

Combustion zone 54 contains a dense fluidized bed of a non-combustible diluent material, such as sand, having a particle size appreciably coarser than that of the solid admitted through grid 52. The particle size depends on the density and the character of the non-combustible material. When said is used, particle mesh sizes varying from 8 to 180, preferably from 20 to 40, are usually suitable depending on the size of the coke particles fed. The dimensions of the non-combustible solids bed in zone 54 are such that combustion takes place at an average carbon concentration of not more than about 1%, preferably of about 0.1–0.5%. Combustion temperatures of 1500 F. and above may be maintained in this manner.

The linear velocity of the gas within zone 54 is so chosen that the coarse non-combustible fluids are maintained in a highly turbulent state without being entrained in and carried away with the upwardly flowing gases to any substantial extent. The gas velocity should, however, be high enough fully to entrain the smaller sized solids fed through grid 52. Such velocities may range from about 1 to about 20 ft. per second depending on the character and particle size of the solids used. Velocities of 3–10 ft. per second are generally suitable for sand particles larger than 60 mesh and process solids particles of 20 to 60 mesh. In this manner, the coarse non-combustible solids are caused to stay within zone 54 while the solids introduced through grid 52 and their solid residue are carried overhead into a phase 56 of fine carbonaceous solids in flue gases, having an upper level $L_{56}$. In general, it is desirable to maintain zone 56 which has a relatively high carbon concentration as thin as feasible in order to prevent appreciable formation of CO.

This separation may be substantially improved by inserting between zones 54 and 56 a refractory tower packing 58 of Raschig rings or similar bodies of non-fluidizable particle size which blocks the passage of coarse non-combustible particles while allowing the fine material to penetrate. Conventional screening means of sufficient heat resistance may take the place of the tower packing.

Another means of enhancing the desired separation between fine and coarse particles consists in enlarging the cross-section of heater 50 above combustion zone 54. In this manner, the linear velocity of the flue gases is substantially reduced above zone 54 and any entrained coarse material is caused to drop back into zone 54. If desired, an enlarged cross-section of zone 56 may be combined with arrangement of screening means between zones 54 and 56, as shown in the drawing.

Hot flue gases, pass overhead from level $L_{56}$ through line 60 into a conventional gas solids separator 61. Separated fines may be returned to zone 56 through line 62 or discarded through line 64. Flue gases substantially free of solids are withdrawn through line 66 to be vented, if desired, after heat exchange with feed gases and/or solids, or to be used for fluidization, aeration and/or stripping purposes in the process.

The temperature in combustion zone 54 is preferably so maintained that the solids collecting in zone 56 have the highest possible temperature commensurate with economical construction materials and the fusion or softening point of the ash. This temperature lies generally between about 1600° and 2300° F. If the ash fusion point restricts the upper temperature limit the feed coal may be treated with materials increasing the fusion point of the ash, such as silica or alumina to permit a temperature increase of about 100°–200° F.

Fluidized carbonaceous solids from zone 56 are returned through line 55 to coker 10, if desired, via line 7. Line 55 may be a conventional standpipe aerated through one or more taps 53 and provided with a slide valve 57. The amount of solids flowing through pipe 55 depends on the desired temperature differential between zones 12 and 56, the temperature and quantity of coal entering in line 1, the specific heat of the solids and the heat required for coking the coal.

Another considerably larger amount of solids is withdrawn from zone 56 through standpipe 59, aerated through taps 61 and provided with control valve 63. This quantity of hot solids is returned to gas generator 30, if desired, via line 28, as shown in the drawing, to supply the heat required in zone 34. In accordance with the higher temperature and the normally larger dimensions of gas generator 30, the amount of solids recycled to generator 30 is many times that recycled to coker 10, and amounts to about 200 lbs. of recirculated solids per lb. of carbon consumed in zone 34 when the temperature is 100° F. lower in zone 34 than in zone 54. If desired or necessary, these solids returned from zone 56 may be subjected to further "classification" and more inert diluent solids separated out and returned to zone 56 before the carbonaceous solids are carried over to zone 34.

Some of the coarse non-combustible material in zone 54 will undergo disintegration by attrition and will be carried out of zone 54 with the flue gases or removed ultimately with the ash through line 43. This loss of solids from zone 54 may be made up by supplying fresh coarse non-combustible material through line 68.

Standpipes 24, 45, 55 and 59 may be replaced by other conventional conveying means, such as screw conveyors. The solids return through lines 55 and 59 to zones 12 and 34 may take place directly rather than via lines 7 and 28, respectively. Solids discard lines 22, 43, 64 and/or 42 may be used to prevent an undesired accumulation of ash in the system.

The system illustrated in Figure 2 employs a different kind of heater and may be operated employing different types of solids separation means.

Referring now in detail to Figure 2, finely divided carbonaceous solids, such as carbonization coal having a particle size of about 8 mesh and finer is supplied through line 201, suspended in steam fed from line 205 and passed through line 207 and grid 209 into carbonization zone 212 of coker 210. The solids in zone 212 are fluidized substantially as outlined in connection with zone 12 of Figure 1. The temperature of zone 212 is maintained at about 800°–1400° F. with the aid of hot solid gasification residue returned from gas generator 230 as will appear more clearly hereinafter.

Volatile carbonization products are withdrawn overhead from level $L_{210}$ through line 214 and gas-solids separator 216 from which solids fines may be returned through line 220 to zone 212 or discarded through line 222. Volatile products free of solids are recovered through line 218.

A mixture of fluidized coke and solid gasification residue is withdrawn downwardly through standpipe 224 aerated through taps 225 and provided with slide valve 226. The solids pass under the pseudo-hydrostatic pressure of standpipe 224 through line 228 to enter the bottom of a vertical transfer line heater 250.

Transfer line heater 250 contains a subdivided noncombustible solid differing in density, particle size, magnetic and/or electric properties from the solids supplied through line 228. For the purpose of this example, the non-combustible solid will be assumed to be sand having a particle size of about 8 to 60 mesh.

Air is supplied from compressor 249 through line 248 to the bottom of heater 250 at such a linear velocity that the sand and carbonaceous solids are entrained in the air and carried through heater 250 into classifier 266. Gas velocities of about 4 to 60 ft. per second, preferably 20 to 40 ft. per second, in heater 250 are suitable for this purpose. The concentration of sand in heater 250 will be greater than that of the carbonaceous solids and combustion may take place at a low carbon concentration of, say, about 0.5 to 2.0% to establish combustion temperatures of about 1800°–2200° F. Some advantage can be realized in preventing CO formation by admitting only a portion of the air to the bottom of heater 250 and injecting the balance at one or more intermediate points 248a or even at the top of heater 250.

A mixture of coarse and/or dense sand and fine and/or light carbonaceous solids and combustion residue suspended in flue gases enters the classification zone 266. Due to the enlarged cross-section of zone 266 and the reduced gas velocity, the heavier sand settles to form a lower layer 267 while the lighter carbonaceous material and combustion residue concentrate in an upper layer 269. This separation may be enhanced by blowing small amounts of a hot fluidizing gas, such as hot flue gas, through line 271 into the bottom of classification zone 266. To prevent CO formation, zone 269 should be as shallow as feasible, preferably less than 3 ft.

Flue gases pass through line 273 into a gas-solids separator 275 from which hot flue gases are withdrawn through line 277 for any desired use, such as heat exchange, fluidization, aeration, etc. Separated solids fines consisting mainly of coke are returned through line 279 to gasification zone 234 of generator 230. Any desired amount may be discarded through line 281.

Relatively fine solids from zone 269 comprising coke and combustion residue with a relatively high carbon concentration pass downwardly through pipe 259 substantially at the temperature of the outlet of heater 250 to supply, simultaneously, heat and carbonaceous feed to the gas generation reaction in zone 234. The steam required for the reaction and fluidization is supplied under pressure through line 235 and grid 232, to establish a fluidized reacting mass similar to that of zone 34 of Figure 1. The ratio of hot solids and steam supplied to zone 234 is so chosen that a gasification temperature of about 1600°–1900° F. is maintained at a carbon concentration of about 10–40%. Actual conditions will vary with the reactivity of the coke used.

A gas containing CO and $H_2$ is withdrawn overhead from level $L_{230}$ and passed through line 236 to gas-solids separator 238 and through line 244 to any desired use. Separated solids fines may be returned to zone 234 through line 240 or discarded through line 242.

Solid gasification residue containing ash from classifier 266 is withdrawn downwardly from zone 234 through a standpipe 245 aerated through taps 246 and provided with slide valve 247. A minor proportion of the solids in standpipe 245 is returned substantially at the temperature of zone 234 through line 255 to coker 210, if desired, via line 207 to supply heat to zone 212. A major proportion of the solids from standpipe 245 is passed through line 287 and returned to the bottom of heater 250.

Returning now to classifier 266, coarse sand is withdrawn downwardly from zone 267 through pipe 283 which may be aerated through taps 285. The sand is returned through line 287 together with gasification residue to the bottom of heater 250. Fresh coarse sand may be added to the system through line 268.

While reference has been made to a relatively coarse noncombustible material and a fluidized settler-classifier for the separation of non-combustible from combustible solids, other means may be used for this purpose. For example, the non-combustible material may be of similar particle size but different density as compared with the carbonaceous material and separation zone 266 may be a selective centrifugal separator. Or they may differ in an electric and/or magnetic property and separation zone 266 may be an electric and/or magnetic type separator. Other modifications within the spirit of the invention may occur to those skilled in the art.

The process of the present invention may be made fully continuous by continuously feeding the solid and gaseous charge materials and continuously withdrawing product gases and discarding ashes. All feed materials may be preheated to any desired temperatures, particularly during the starting period, in a manner known per se.

When a highly plastic or liquid carbonaceous charge such as a residual oil is used in any of the systems described above, the coker is supplied with a dry fluidized solids mass, such as coke or fine sand on which the carbonaceous charge is deposited and carbonized. It will also be understood that the coking zone may be omitted and coal or coke or the like fed directly to the gas generator. If no water gas is desired, the gas generator may be omitted and the coke from the coker may be directly burned in the heater. The separation between non-combustible and heat-carrying solids need not be quantitative as long as the desired carbon concentrations are maintained in the heater and the conversion zones. If desired, air and/or oxygen may be supplied to the coker and/or gas generator of the systems of the drawing to supply additional heat by combustion in these conversion zones. Other changes or alternations of the systems shown herein which may be devised by those skilled in the art are within the scope of this invention.

The invention will be further illustrated by the following data for the combustion of coke diluted with sand in various proportions as compared with water-gas generation by the reaction of coke and steam.

TABLE 1

*Coke combustion data at 1800° F.*

[Atmospheric pressure—1 ft./sec. superficial air velocity.]

| Type of Coke | Carbon Concentration¹ (wt. percent) | Bed Depth (ft.) | Contact Time (secs.) | Flue Gas Composition, Mol. Percent | | |
|---|---|---|---|---|---|---|
| | | | | CO | $O_2$ | $CO_2$ |
| Koppers (High Temp.) | 0.85 | 1 | 1 | 0.3 | 0.5 | 19 |
| | 8.50 | 1 | 1 | 0.3 | 0.3 | 19 |
| | 85.00 | 1 | 1 | 4 | 0 | 17 |
| | 0.85 | 2.5 | 2.5 | 0.5 | 0.2 | 19.6 |
| | 1.70 | 2.5 | 2.5 | 0.0 | 0.2 | 19.2 |
| | 3.40 | 2.5 | 2.5 | 0.1 | 0.7 | 18.4 |
| | 8.50 | 2.5 | 2.5 | 0.4 | 0.2 | 19.2 |
| | 25.50 | 2.5 | 2.5 | 10.8 | 0.4 | 12.4 |
| Disco (Low Temp.) | 0.85 | 1 | 1 | 0.5 | 3 | 17.5 |
| | 3.40 | 1 | 1 | 1 | 1 | 17.5 |
| | 8.50 | 1 | 1 | 2 | 0.4 | 16.5 |
| | 85.00 | 1 | 1 | 7 | 0 | 12 |
| | 0.85 | 2.5 | 2.5 | 0.4 | 2.6 | 17.2 |
| | 8.50 | 2.5 | 2.5 | 3.8 | 0.4 | 16.8 |
| | 85.00 | 2.5 | 2.5 | 17.4 | 0.2 | 6.2 |
| Fluidized Char (Low Temp.) | 8.50 | 2.5 | 2.5 | 7.0 | 0.2 | 14.2 |
| | 85.00 | 2.5 | 2.5 | 23.0 | 0.2 | 3.8 |

¹ Sand used for dilution of the coke when diluted.

TABLE 2

*Water gas generation data—atm. pressure*

| Type of Coke | Carbon Concentration (wt. percent) | Temperature, °F. | Contact Time (secs.) | Steam Conversion (percent) |
| --- | --- | --- | --- | --- |
| Koppers (High Temp.) | 3.57 | 1,846 | 8.4 | 12.6 |
| | 8.33 | 1,840 | 9.2 | 34 |
| | 85.00 | 1,800 | 9.3 | 57 |
| | 85.00 | 1,800 | 2.5 | ¹24 |
| | 25.50 | 1,800 | 2.5 | ¹8.5 |
| | 8.50 | 1,800 | 2.5 | ¹3 |
| | 3.40 | 1,800 | 2.5 | ¹1 |
| | 0.85 | 1,800 | 2.5 | ¹0.2 |
| Disco or Fluid Char (Low Temp.) | 85.00 | 1,800 | 9.3 | 87 |
| | 85.00 | 1,800 | 2.5 | ¹49 |
| | 25.50 | 1,800 | 2.5 | ¹21 |
| | 8.50 | 1,800 | 2.5 | ¹8 |
| | 3.40 | 1,800 | 2.5 | ¹3 |

¹ Data estimated from plots of reaction rate constants obtained with contact times of about 8 to 24 seconds.

The above data show that the combustion reaction is so rapid that either very short contact times or very low carbon concentrations must be employed to minimize loss of potential fuel as CO in the exit flue gas. The steam reaction, on the other hand, is relatively so much slower for the same type of coke that longer contact time or greater carbon concentrations or both must be employed to get the desired high steam conversions. It follows that the process of the present invention by which the carbon concentration in the combustion zone may be maintained low without effecting the desired high carbon concentration in the gas generator will provide most beneficial results.

While the foregoing description and exemplary operations have served to illustrate specific applications and results of the present invention, other modifications obvious to those skilled in the art are within the scope of the invention. Only such limitations should be imposed on the invention as are indicated in the appended claims.

This application is a continuation of copending application Serial No. 716,748, filed December 17, 1946, and now abandoned.

What is claimed is:

1. In an endothermic chemical process wherein particulate solids of relatively high carbon content are maintained as a fluidized bed in a reaction zone at a conversion temperature, said fluidized bed having a carbon concentration above 10%, wherein a portion of said particulate solids is circulated through a combustion zone and back to maintain said conversion temperature, and wherein said particulate solids are partially burned in said combustion zone by suspension in an oxidizing gas and heated to a temperature above said conversion temperature; the improvement which comprises diluting said particulate solids in said combustion zone with an extraneous non-combustible powdered solid diluent to maintain a carbon concentration in said combustion zone in the range of 0.5 to 2.0%, said diluent being substantially less buoyant in gases than said particulate solids such that said diluent and particulate solids are separable by physical means, and separating said solid diluent from said particulate solids in a separation zone before returning said particulate solids to said reaction zone, whereby high calorific efficiency is obtained in said combustion zone.

2. The improvement of claim 1 wherein said separation zone comprises a gravity settling zone operating at gas velocities lower than the gas velocities in said combustion zone such that said particulate solids form an upper fluidized layer relatively free from said diluent.

3. The improvement of claim 1 wherein said separation zone comprises a selective centrifugal separation zone wherein said diluent is separated from said particulate solids according to size and density.

4. The improvement of claim 1 wherein said endothermic chemical process includes the gasification of carbonaceous solids with steam and said particulate solids comprise the gasification residue of said process.

5. The process of claim 1 wherein said particulate solids and diluent are maintained in said combustion zone as a dense ebullient mass fluidized by said oxidizing gas.

6. In an endothermic chemical process wherein particulate solids of relatively high carbon content are maintained as a fluidized bed in a reaction zone at a conversion temperature, said fluidized bed having a carbon concentration above 10%, wherein a portion of said particulate solids is circulated through a combustion zone and back to maintain said conversion temperature, and wherein said particulate solids are partially burned in said combustion zone by suspension in an oxidizing gas and heated to a temperature above said conversion temperature, said combustion zone comprising a narrowly confined elongated zone of substantially constant cross-sectional area, the length of which is a high multiple of the width, the velocity of said oxidizing gas in said combustion zone being in the range of 4 to 60 ft./sec. such that all solids supplied to the combustion zone are ultimately removed therefrom in the direction of gas flow; the improvement which comprises diluting said particulate solids in said combustion zone with an extraneous non-combustible powdered solid diluent to maintain a carbon concentration in said combustion zone in the range of 0.5 to 2.0%, said diluent being substantially less buoyant in gases than said particulate solids such that said diluent and particulate solids are separable by physical means, and separating said solid diluent from said particulate solids in a separation zone before returning said particulate solids to said reaction zone, whereby high calorific efficiency is obtained in said combustion zone.

7. An endothermic coking process which comprises converting a residual oil in a fluidized bed of particulate solids maintained in a reaction zone at a conversion temperature, circulating a portion of said particulate solids of relatively high carbon content through a combustion zone and back to maintain said conversion temperature, said combustion zone comprising a narrowly confined elongated zone of substantially uniform cross-sectional area with said particulate solids being conveyed therethrough and partially burned by suspension in an oxidizing gas thereby heating the solids to a temperature above said conversion temperature; diluting said particulate solids in said combustion zone with an extraneous non-combustible powdered solid diluent to maintain a carbon concentration in said combustion zone in the range of 0.5 to 2.0 wt. per cent, said diluent being substantially less buoyant than said particulate solids, separating said diluent from said particulate solids in a separation zone by gravity settling whereby said particulate solids form an upper fluidized layer and said diluent forms a lower layer in said settling zone, returning particulate solids so separated to said reaction zone and returning diluent so separated to the initial portion of said combustion zone, whereby high calorific efficiency is obtained in said combustion zone.

References Cited in the file of this patent

UNITED STATES PATENTS

| | | |
| --- | --- | --- |
| 1,475,502 | Manning | Nov. 27, 1923 |
| 1,606,719 | Pollock | Nov. 9, 1926 |
| 1,805,109 | Runge et al. | May 12, 1931 |
| 1,941,809 | McKee | Jan. 2, 1934 |
| 2,088,879 | Stouff | Aug. 3, 1937 |
| 2,393,636 | Johnson | Jan. 29, 1946 |
| 2,445,328 | Keith | July 20, 1948 |

(Other references on following page)

UNITED STATES PATENTS

| | | |
|---|---|---|
| 2,456,796 | Schutte | Dec. 21, 1948 |
| 2,465,464 | Meyer | Mar. 29, 1949 |
| 2,543,884 | Weikart | Mar. 6, 1951 |
| 2,579,397 | Roetheli | Dec. 18, 1951 |
| 2,588,075 | Barr et al. | Mar. 4, 1952 |
| 2,608,526 | Rex | Aug. 26, 1952 |
| 2,622,973 | Barr | Dec. 23, 1952 |
| 2,618,544 | Fischer et al. | Nov. 18, 1952 |

FOREIGN PATENTS

| | | |
|---|---|---|
| 925,264 | France | Mar. 24, 1947 |